United States Patent [19]

Barnow

[11] 4,332,304
[45] Jun. 1, 1982

[54] TRANSFER CASE CONVERSION KIT

[76] Inventor: Charles A. Barnow, 11599 Newcastle Ave., Granada Hills, Calif. 91344

[21] Appl. No.: 101,156

[22] Filed: Dec. 7, 1979

[51] Int. Cl.³ .................... B60K 17/34; B60K 23/08
[52] U.S. Cl. ................................. 180/233; 180/247; 180/248
[58] Field of Search ............... 180/250, 249, 248, 247, 180/233; 74/710.5

[56] References Cited

U.S. PATENT DOCUMENTS

| | | | |
|---|---|---|---|
| 2,228,581 | 1/1941 | Olen | 74/710.5 |
| 2,329,916 | 9/1943 | Lamb et al. | 180/247 |
| 3,283,298 | 11/1966 | Kaiser | 180/247 |
| 3,848,691 | 11/1974 | Dolan | 180/250 |
| 4,037,429 | 7/1977 | Britzius | 180/233 |

Primary Examiner—John A. Pekar
Attorney, Agent, or Firm—Vernon D. Beehler

[57] ABSTRACT

In a four-wheel drive vehicle wherein the forward pair of wheels is driven through one differential assembly and the rearward pair of wheels through another differential assembly there is a transfer case through which power originating in the engine is distributed, or transfered, to the two differential assemblies. In the transfer case there is normally a third differential mechanism to compensate for differences in performance between the forward pair of wheels and rearward pair of wheels during on-the-road travel. The conversion kit of the invention makes use of a direct power transfer component in the transfer case at a location taking the place of the third differential mechanism, previously removed from the case. A hand manipulated lever adjacent the driver's seat operably connected to an interlocking element in the conversion kit enables the vehicle operator, at will, to connect power from the power train to the forward pair of wheels and, when desired, to disconnect the power for on/off the road travel.

13 Claims, 8 Drawing Figures

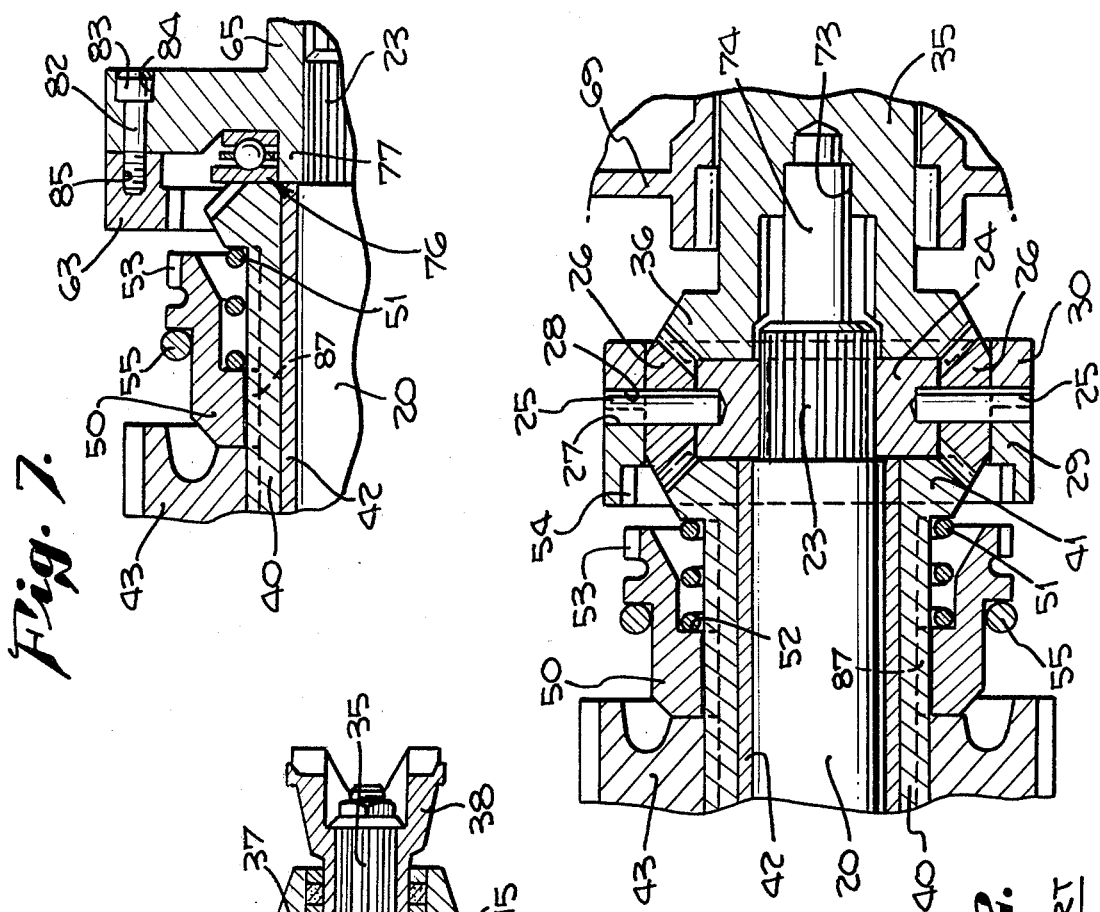
Fig. 1. PRIOR ART
Fig. 2. PRIOR ART
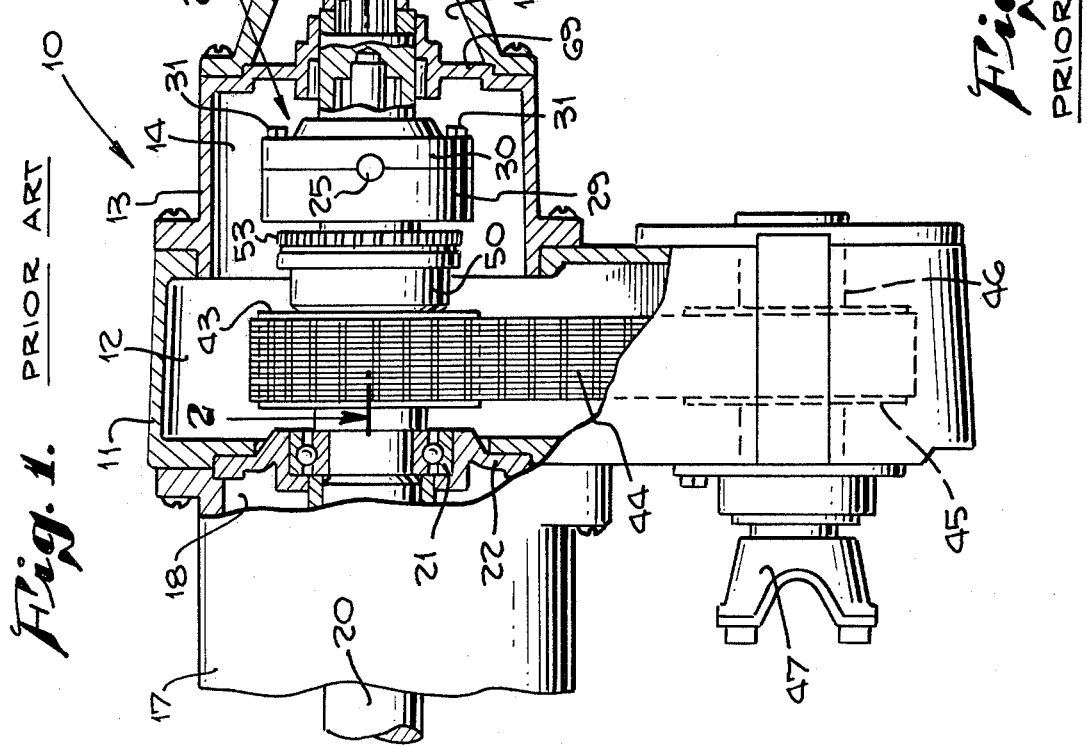
Fig. 7.

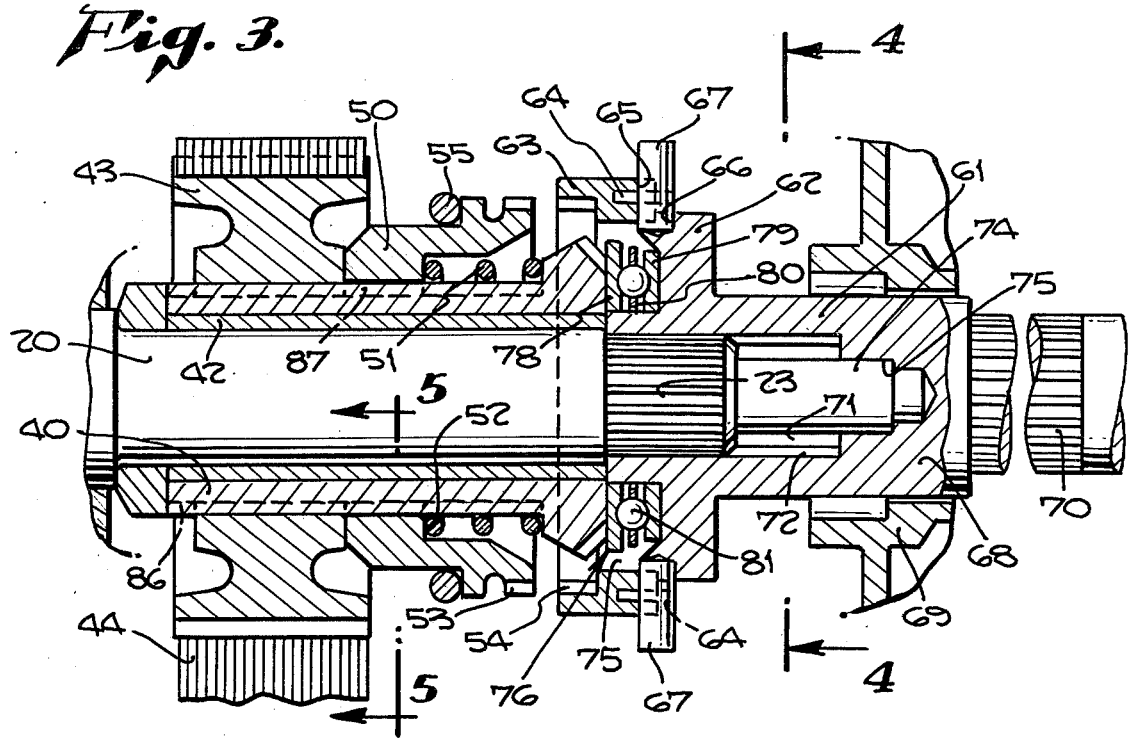
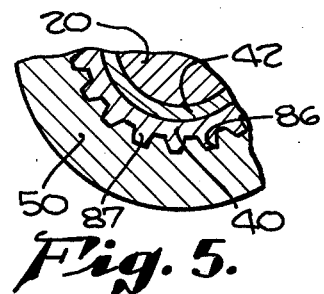
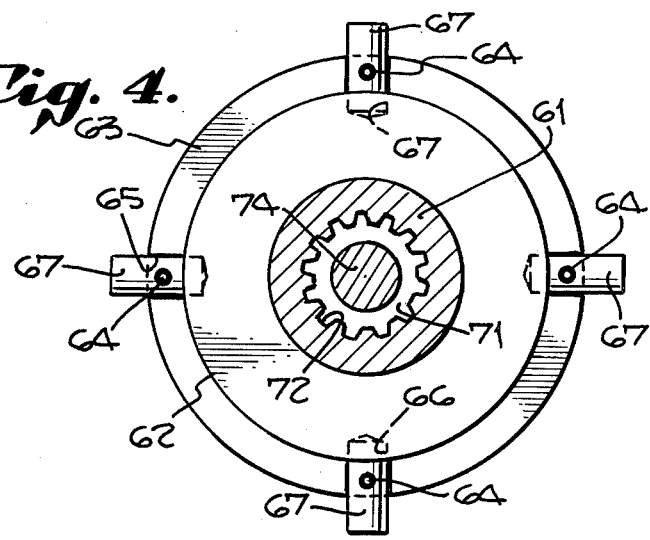
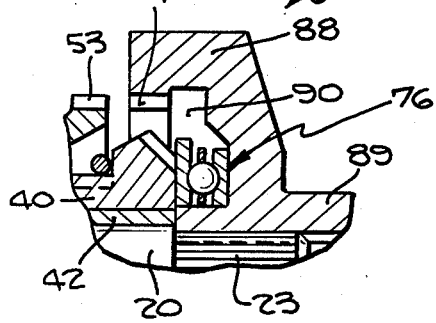
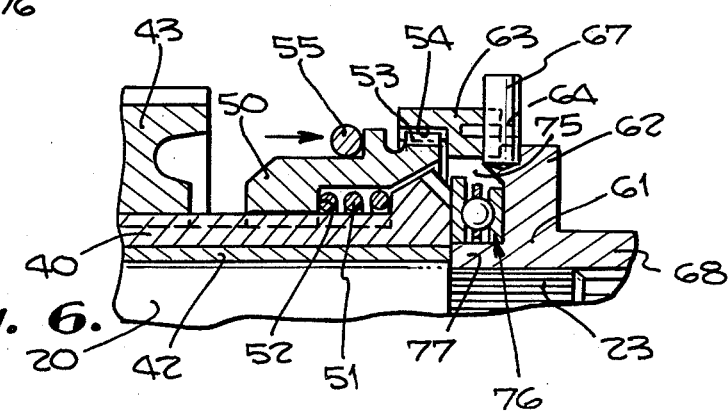

TRANSFER CASE CONVERSION KIT

In view of the current popularity of four-wheel drive vehicles, especially adapted to off-the-highway travel, an appreciable attention has been given to a mechanism capable of disengaging the drive on one of the pairs of wheels, usually the front pair, when four-wheel drive is not needed as, for example, when the vehicle is being driven over a smooth highway. Hubs at the wheels, capable of locking and unlocking the wheels from the axle at will, have been employed, usually for disengaging the front wheels, when only rear wheel traction is needed. This has the disadvantage of making it necessary for the vehicle operator to stop the vehicle and physically manipulate the locking hubs to the desired position.

To obviate the need for such an adjustment, some developments have featured an interaxle differential to allow speed differences between front and rear axles when running on a paved surface. Although a disengagement expedient may be provided for disengaging power operation of one of the pairs of wheels, usually the front pair, the disengagement has invariably been one directed to the wheels only and not the drive train for the wheels, which has to continue in operation even though not in use. Such a drive train may include several gear sets, a U-joint shaft which attached axles, and other moving friction generating parts. Fuel that is consumed in performing work required to move such non-functioning parts is wasted fuel which could otherwise be used for traction. As a consequence, even though power may not be actually supplied to the forward pair of wheels, there continues to be power consumed and also wear on the moving parts.

Other attempts to accomplish a disconnection of one of the pairs of wheels not needed for traction have been complex and for that reason high in cost and needful of appreciable maintenance.

It is therefore among the objects to provide a new and improved transfer conversion mechanism for the transfer case of a four-wheel drive vehicle which comprises a simple, though relatively rigid, rotating power transfer component replacing various movable elements in the transfer case.

Another object of the invention is to provide a new and improved transfer conversion mechanism of a type such that various movable parts are disengaged so as not to be moved while in idling attitude, thereby to minimize wear on the forward drive train.

Still another object of the invention is to provide a new and improved transfer conversion mechanism for a four-wheel drive vehicle having substantially a minimum number of moving parts and of a minimum amount of high precision fabrication whereby to provide a conversion mechanism which can be produced at a lower cost than prior mechanisms.

Still another object of the invention is to provide a new and improved transfer conversion mechanism for a four-wheel drive vehicle of such limited number of individual parts and simple installation as to be capable of installation in the drive train of a vehicle by persons of no more than modest skill.

Still further among the objects of the invention is to provide a new and improved transfer conversion mechanism for four-wheel drive vehicles capable of connecting the drive train to the forward pair of wheels and subsequently disconnecting the forward pair of wheels at will by a simple lever action.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a side elevational view, partially broken away, showing a conventional transfer case assembly for a full-time four-wheel drive.

FIG. 2 is a fragmentary longitudinal sectional view taken on the line 2—2 of FIG. 1.

FIG. 3 is a fragmentary sectional view of elements of the conversion kit replacing conventional elements of FIG. 1.

FIG. 4 is a cross-sectional view on the line 4—4 of FIG. 3.

FIG. 5 is a fragmentary cross-sectional view on the line 5—5 of FIG. 3.

FIG. 6 is a fragmentary longitudinal sectional view showing the device of FIG. 3 in position for four-wheel drive operation.

FIG. 7 is a fragmentary sectional view similar to FIG. 6 of another form showing the position of parts for two-wheel drive operation.

FIG. 8 is a fragmentary sectional view similar to FIG. 6 of still another form of the invention.

For a better understanding of the invention, there is shown in FIGS. 1 and 2 a currently available mechanism customarily identified as a differential assembly mounted within a transfer case or housing indicated generally by the reference character 10 consisting of a central section 11 housing a central chamber 12 and, as herein designated, a main section 13 housing a main chamber 14, a cap section 15 housing a cap chamber 16, and an end section 17 housing an end chamber 18. For providing power to a differential transfer assembly 19, there is a drive shaft 20 rotatably mounted within a bearing race 21 in a bearing ring 22 clamped between the end section 17 and the central section 11.

Non-rotatably mounted on a splined band 23 is an annular collar 24 on which are four radially extending pins 25, each of which freely rotates a pinion 26. The pins 25 extend radially outwardly into apertures 27 and 28 on respective carrier members 29 and 30. Bolts 31 may be employed to anchor the carrier members 29 and 30 in engaged position.

Rotating with the pinions 26 is a rear wheel output shaft 35 provided with a beveled crown gear 36. A bearing ring 37 rotatably supports the output shaft 35 in the cap section 15. A yoke 38 splined to the output shaft 35 is the means by which the rear pair of wheels (not shown) of the vehicle are driven through their own differential.

On the opposite side a front wheel output shaft 40 has a crown gear 41 rotating with the same pinions 26, the front wheel output being rotatably supported upon a bearing 42 on the drive shaft 20. Splined to the output shaft 40 is a sprocket 43 around which passes a drive chain 44, the chain engaging a sprocket 45 for rotating a shaft 46 on which is a yoke 47 adapted to be attached in driving relationship with a pair of front wheels (not shown) of the vehicle.

In the relationship described, the front and rear yokes are in full-time drive position which means that all four wheels, namely, the rear pair and front pair wheels, are being driven through the differential transfer assembly 19. This would be the desirable adjustment for off-the-road transportation of the vehicle.

To change the relative position of the parts, there is provided a slider 50 splined upon the front wheel output shaft gear 40 but slidable with relation to it. A spring 51 bottomed on a shoulder 52 in the slider and against the crown gear 41 normally holds the slider in the position of FIG. 2 wherein teeth 53 of the slider are out of engagement with complementary teeth 54 of the carrier member 29. By manipulation of a conventional lever (not shown), terminating in a fork 55, the slider can be moved against tension of the spring 51 so that the teeth 53 engage the teeth 54. Under those circumstances the front wheel output shaft 40 is by-passed and the sprocket 43 directly driven from the drive shaft 20 through the carrier members 29 and 30, with rotation of the pinions 26 being frozen.

An embodiment of the invention chosen for the purpose of illustration is shown located in the same housing 10 and activated by the same drive shaft 20, as has been previously made reference to, and wherein the front wheel output shaft gear 40 is in splined relationship with the sprocket 43. The drive shaft 20, by having been provided with circumferential splines 23, has a direct drive splined engagement with a conversion shaft component 61. The conversion shaft component 61 comprises in part an assembly bracket 62 serving as a carrier member. The assembly bracket 62 is adapted to be anchored to the carrier member 29, or 63 as identified in FIGS. 3 and 6, by use of roll pins 64, extending through spokes 67, the carrier member 63 being the same as the carrier member 29 previously made reference to. In the carrier member 63 are recesses 65 complementary with respect to recesses 66 in the assembly bracket 62. The recesses are for accommodation of spokes 67 which are carried by the carrier member 62. A portion 68 of the conversion shaft component 61, rotatably supported in a partition 69 forming part of the main section 13, is provided with circumferentially extending splines 70 which are adapted to non-rotatably attach the yoke 38 to the conversion shaft component 61.

Within the left end of the conversion shaft component 61 is a recess 71. Interior splines 72 are adapted for splined engagement with the splines 23 of the drive shaft 20. A pocket 73 rotatably receives an extension 74 of the drive shaft 20 so as to provide a bearing support for the drive shaft.

Acting together the assembly bracket 62 and carrier member 29 provide a chamber 75 within which is located a thrust bearing 76. The thrust bearing extends around a concentric inner portion 77 of the conversion shaft component 61. In the embodiment shown by way of example, the thrust bearing 76 consists of inner and outer washers 78 and 79 separated by a bearing race 80 provided with ball bearings 81. The thrust bearing 76 provides for endwise thrust of the front wheel output shaft gear 40 which must be provided with a degree of end play.

In the form of invention of FIG. 7, the spokes 67 are dispensed with. For attaching the carrier member 63 and assembly bracket 62 together to serve as a unit, bolts 82 having heads 83 concealed within the recesses 84 in the assembly bracket 62 extend through bolt holes 84 into threaded holes 85 of the carrier member 63.

From the foregoing description it will be clear that the drive shaft 20 is connected by a direct drive connection to the conversion shaft component 61 by the splines 23 and 72. In normal position of the slider 50, as shown in FIG. 3, and also FIG. 7, there is no drive connection between the drive shaft 20 and the sprocket 43. This is because the front wheel output shaft 40 rotates freely upon the bearing 42 and the drive shaft 20. As a consequence, all of the power generated in the drive shaft 20 is carried directly to the rear yoke 38 for driving the rear wheels of the vehicle. The yoke 47 idles and accordingly the front wheels of the vehicle will also idle, or rotate freely, as the vehicle is moved by operation of the rear wheels.

When the transfer case conversion kit is to be employed to convert from two-wheel drive to four-wheel drive, the fork 55 is manipulated by its associated lever (not shown) so as to shift the slider 50 from the left-hand normal position of FIG. 3 to the right-hand extended position of FIG. 6 against tension of the spring 51. In this position the teeth 53 of the slider engage the teeth 54 of the carrier member 63. Since, in effect, the carrier member 63 and assembly bracket 62 non-rotatably engage each other by action of the spokes 67, the slider 50 is rotatably driven by action of the drive shaft 20 through the conversion shaft component 61. Since the slider is connected by splines 86 and 87 to the front wheel output shaft gear 40, which is in turn splined to the sprocket 43, the sprocket 43 will then drive the chain 44 and as a consequence the yoke 47 will be rotated, which is the yoke for driving the forward pair of wheels. The arrangement just described is for off-the-road travel. When the vehicle is to again be made ready for on-the-road travel, the yoke 47 can be disengaged from a driving relationship by shifting the fork 55 in a direction from right to left, as viewed in FIGS. 3 and 6. When this is done, the spring 51 will expand and move the slider 50 from right to left, as viewed in FIGS. 3 and 6, a distance sufficient to disengage the teeth 53 from the teeth 54. This is the position of FIG. 3. In this position there is no driving relationship between the drive shaft 20 and the sprocket 43. Accordingly, therefore, the yoke 47 runs free as does also the forward pair of wheels.

In the embodiment of the invention of FIG. 8 an assembly bracket 88 has an axial length substantially the same as the aggregate axial length of both of the carrier members 29 and 30 of FIGS. 1 and 2. The bracket 88 is integral with the conversion shaft component 89 on one side and provides a chamber 90 on the opposite side. At the edge of the chamber 90 are circumferentially disposed teeth 91 which are complementary with respect to teeth 53 of the slider 50. The same thrust bearing 76 may also be used with the embodiment of the device.

While particular embodiments of the present invention have been shown and described, it will be obvious to those skilled in the art that changes and modifications may be made without departing from the invention in its broader aspects, and therefore, the aim of its appended claims is to cover all such changes and modifications as fall within the true spirit and scope of the invention.

Having described the invention, what is claimed as new in support of Letters Patent is as follows:

1. A transfer conversion mechanism for use in a transfer case through which engine power of a vehicle is transferred to respectively a drive attachment for a forward pair of wheels and a drive attachment for a rear pair of wheels, and wherein there is a differential carrier assembly comprising first and second carrier members in separable engagement with each other providing a chamber therebetween and a drive shaft therefor, the differential carrier assembly including a slider member having an axially shiftable and non-rotatable mounting relative to one of said drive attachments, non-rotatable engagement means adapted to releasably interconnect the slider member and said first carrier member, said slider member having a path of movement between positions of interconnection and release of said slider member with said first carrier member, a plurality of bevel gear elements held in operating position in said chamber during engagement of said first and second carrier members with each other and in driven relationship with said drive shaft, first and second output shaft members located one on each side of said plurality of bevel gear elements, each output shaft member having a single bevel gear element in engagement with said plurality of bevel gear elements, each of said first and second output shaft members being in operative relationship with one of said drive attachments, said conversion mechanism comprising a conversion shaft component for replacement of one of said output shaft members said conversion shaft component having means providing a driven engagement with said drive shaft, a direct drive connection means for connection to the respective drive attachment and an assembly bracket including attachment means for attachment to said first carrier member upon removal of the other carrier member the plurality of bevel gear elements and the respective output shaft member.

2. A transfer conversion mechanism as in claim 1 wherein the assembly bracket has substantially the same size and configuration as the carrier member which remains.

3. A transfer conversion mechanism as in claim 1 wherein said assembly bracket has a concentric inner portion and a thrust bearing in operative relationship with said inner portion in a position facing said first carrier member.

4. A transfer conversion mechanism as in claim 3 wherein one of said output shaft members is adapted to remain in place and said thrust bearing has a position of engagement between said assembly bracket and said one of said output shaft members.

5. A transfer conversion mechanism as in claim 1 wherein the direct drive connection means is in position and direction for drive attachment with the rear pair of wheels.

6. A transfer conversion mechanism as in claim 1 wherein there is an exterior housing in a position encompassing said first carrier member, said assembly bracket and said conversion shaft component.

7. A transfer conversion mechanism as in claim 1 wherein said attachment means for the assembly bracket comprises a plurality of circumferentially spaced projections and complementary recesses on said one of said carrier members.

8. A transfer conversion mechanism as in claim 1 wherein there is a hand actuated lever means, a sprocket in driving engagement with the respective output shaft member, said non-rotatable engagement means comprising a releasable connection between said first carrier member and said sprocket, said releasable connection being shiftable in an axial direction between engaged and released positions in response to movement by said lever means when said attachment means is in engagement with the respective carrier member.

9. A transfer conversion mechanism as in claim 1 wherein said attachment means comprises a plurality of radially extending spokes adapted for retention in complementary recesses located between said carrier means.

10. A transfer conversion mechanism for use in a transfer case through which engine power of a vehicle is transferred to respectively a drive attachment for a forward pair of wheels and a drive attachment for a rear pair of wheels, and wherein there is a differential carrier assembly comprising first and second carrier members in separable engagement with each other providing a chamber therebetween and a drive shaft therefor, the differential carrier assembly including a slider member having an axially shiftable and non-rotatable mounting relative to one of said drive attachments, non-rotatable engagement means adapted to releasably interconnect the slider member and said first carrier member, said slider member having a path of movement between positions of interconnection and release of said slider member and said first carrier member, a plurality of bevel gear elements held in operating position in said chamber during engagement of said first and second carrier members with each other and in driven relationship with said drive shaft, first and second output shaft members located one on each side of said plurality of bevel gear elements, each output shaft member having a single bevel gear element in engagement with said plurality of bevel gear elements, each of said first and second output shaft members being in operative relationship with one of said drive attachments, said conversion mechanism comprising a conversion shaft component for replacement of one of said output shaft members, said conversion shaft component having means providing a driven engagement with said drive shaft, a direct drive connection means for connection to the respective drive attachment and an assembly bracket including a releasable connection means for engagement with said slider means, said assembly bracket having a mounted position at the location of said carrier members upon removal collectively of said carrier members, the plurality of bevel gear elements and the respective output shaft member.

11. A transfer conversion mechanism as in claim 10 wherein there is a sprocket in driving engagement with the respective output shaft member, and a hand actuated lever means, said releasable connection means being operative between said assembly bracket and said sprocket and movable in an axial direction between engaged and released positions in response to movement by said lever means.

12. A transfer conversion mechanism as in claim 10 wherein said assembly bracket has a concentric inner portion and a thrust bearing in operative relationship with said inner portion in a position facing the respective output shaft member.

13. A transfer conversion mechanism for use in a transfer case through which engine power of a vehicle is transferred to respectively a drive attachment for a forward pair of wheels and a drive attachment for a rear pair of wheels, and wherein there is a differential carrier assembly comprising carrier means having multiple elements providing a chamber therebetween and a drive shaft therefor, the differential carrier assembly including a slider member having an axially shiftable and non-rotatable mounting relative to one of said drive attachments, non-rotatable engagement means adapted to releasably interconnect the slider member and a first element of said carrier means, said slider member having a path of movement between positions of interconnection and release of said slider member with said first element of said carrier means, a plurality of bevel gear elements held in operating position in said chamber during engagement of said first element and a second element of said carrier means with each other and in driven relationship with said drive shaft, first and second output shaft members located one on each side of said plurality of bevel gear elements in engagement with said plurality of bevel gear elements, each of said first and second output shaft members being in operative relationship with one of said drive attachments, said conversion mechanism comprising a conversion component for replacement of certain of said bevel gear elements, said conversion component having means providing a driven engagement with said drive shaft, a direct drive attachment and assembly means including means for effecting engagement with said first element of said carrier means upon removal of said certain of said bevel gear elements.

* * * * *